United States Patent [19]

Nudd et al.

[11] Patent Number: 4,707,859
[45] Date of Patent: Nov. 17, 1987

[54] APPARATUS FOR HIGH SPEED ANALYSIS OF TWO-DIMENSIONAL IMAGES

[75] Inventors: Graham R. Nudd, Broadway, England; Emanuel Marom, Beverly Hills, Calif.

[73] Assignee: Hughes Aircraft Company, Los Angeles, Calif.

[21] Appl. No.: 809,539

[22] Filed: Dec. 16, 1985

[51] Int. Cl.⁴ .............................................. G06K 9/60
[52] U.S. Cl. ........................................ 382/28; 382/49; 382/50; 382/68
[58] Field of Search ................... 382/68, 27, 14, 15, 382/28, 49, 50; 250/208, 578; 358/212, 213; 364/133

[56] References Cited

U.S. PATENT DOCUMENTS

| | | | |
|---|---|---|---|
| 3,400,368 | 9/1968 | Lemay | 382/49 |
| 3,484,747 | 12/1969 | Nunley | 382/68 |
| 3,701,095 | 10/1972 | Yamaguchi et al. | 382/49 |
| 3,964,021 | 6/1976 | Tamches | 382/49 |
| 4,153,946 | 5/1979 | Upton | 382/14 |
| 4,318,083 | 3/1982 | Argyle | 382/28 |
| 4,547,676 | 10/1985 | Suzuki et al. | 250/578 |

Primary Examiner—Leo H. Boudreau
Attorney, Agent, or Firm—Terje Gudmestad; A. W. Karambelas

[57] ABSTRACT

Apparatus is disclosed for high-speed processing of a two-dimensional image using Cellular Array Processors arranged as parallel modules in a multi-level matrix. An array of photosensors is used to provide image intensity signals for each image pixel. Comparator and memory modules are used to convert the sensor signals to digital form using parallel processing techniques.

8 Claims, 6 Drawing Figures

APPARATUS FOR HIGH SPEED ANALYSIS OF TWO-DIMENSIONAL IMAGES

CROSS REFERENCE TO RELATED APPLICATIONS (1) U.S. patent application Ser. No. 342,630, filed Jan. 26, 1982, now Pat. No. 4,507,726, entitled "An Array Processor Architecture utilizing Modular Elemental Processors" invented by J. Grinberg, et al. and assigned to the assignee of the present invention.

(2) U.S. patent application Ser. No. 342,639, filed on Jan. 26, 1982, entitled "Modular Input-Programmable Logic Circuits for use in a Modular Array Processor" invented by S. Hansen, et al. and assigned to the assignee of the present invention.

(3) U.S. patent application Ser. No. 342,640, filed Jan. 26, 1982, entitled "Data Exchange Subsystem for use in a modular Array Processor" invented by S. Hansen, and assigned to the assignee of the present invention.

(4) U.S. patent application Ser. No. 342,671, filed Jan. 26, 1982, now Pat. No. 4,498,134 entitled "Segregator Functional Plane for use in a Modular Array Processor" invented by J. Grinberg and S. Hansen, and assigned to the assignee of the present invention.

BACKGROUND OF THE INVENTION

The present invention generally relates to the field of computer aided data analysis and, in particular, to the highly specialized computers capable of processing two dimensionally structured data sets, generally referred to as images, that are known as Cellular Array Processors (CAP).

In the field of image processing, the Cellular Array Processor is generally well-known as a type of computer system whose architecture is particularly suited for the task of image processing. Although the specific design may differ substantially between different implementations, the general architecture of the Cellular Array Processor is quite distinctive. Typically, a system will include a highly specialized array processor that is controlled by a control processor of conventional design. The array processor, in turn, is formed from a large number of elemental processors that are distributed as individual cells within a regular matrix. (This gives rise to the descriptive name "Cellular Array Processor".)

The elemental processors are essentially identical and generally contain a function-programmable logic circuit and memory register. The programmable logic circuit is typically capable of selectively performing a limited number of primitive logic and arithmetic functions, such as "and", "or", "invert", and "rotate" on the data stored in its respective memory register in conjunction with data provided by the control processor. The control processor is linked to the elemental processors via a common instruction bus. Thus, all of the elemental processors operate separately, yet synchronously, in the performance of a common logical function on the data contained in their respective memory registers. (This is commonly referred to as Single Instruction, Multiple Data, or SIMD operation.)

Cellular Array Processor systems are particularly well suited for image processing applications, since the memory registers present in the cellular array permit the digital representation of the image to be mapped directly into the processor. Thus, the spatial interrelationship of the data within the two-dimensionally structured data set is intrinsically preserved. By directing the array processor to perform a selected sequence of SIMD logical operations corresponding to the performance of a desired image processing algorithm, the data at every point in the image can be processed essentially in parallel.

In order to process an image, it is necessary to convert that image into electrical signals suitable for processing by the CAP. While conventional video cameras are generally used to convert images to electrical signals, their conversion rate is substantially slower than the CAP processing time. This is so because video cameras generally process image information serially, as opposed to the parallel processing capability of the CAP.

Accordingly, it is an object of the present invention to provide high speed conversion of an image to digital signals.

It is another object of the present invention to provide apparatus for high speed analog to digital conversion of two-dimensional information.

SUMMARY OF THE INVENTION

The foregoing and other objects of the invention are accomplished by apparatus for analyzing a two-dimensional image. The apparatus includes a plurality of parallel element processors logically organized as a multi-level matrix where each processor is associated with one of a plurality of data locations. Each processor includes a plurality of modules logically distributed over the multiple levels of the matrix.

A comparator circuit in one of the modules in each processor compares a comparator input signal with a reference signal, and provides a comparator output signal indication when the reference signal exceeds the input signal.

A memory element in one of the modules in each processor stores the value of the reference signal in response to the occurrence of the comparator output signal.

An array of photosensors is provided which is arranged as a matrix and responds to light from the image. Each photosensor in the array corresponds to one pixel of the image as well as to one of the plurality of data locations. Each photosensor provides a sensor output signal whose magnitude is proportional to the brightness of the corresponding pixel. The sensor output signal is provided as the comparator input signal of a corresponding comparator circuit. The reference signal, whose amplitude is varied as a function of time, is provided to all comparator circuits simultaneously.

In a alternate embodiment of the invention, each memory element stores the value of an image attenuation signal in response to the occurrence of the comparator output signal. A variable optical attenuator is placed between the image and the photosensor and is used to decrease the intensity of the image impinging upon the array of photosensors as a function of time. The image attenuation signal is proportional to the decrease in intensity provided by the attenuator. The reference signal, whose amplitude is constant with time, is provided to all comparator circuits simultaneously as in the previous embodiment.

Other objects, features, and advantages of the invention will become apparent by reference to the specification taken in conjunction with the drawings in which like elements are referred to by like reference designations throughout the several views.

DETAILED DESCRIPTION OF THE INVENTION

The present invention is directed to the conversion of an optical image into a digital representation suitable for parallel processing in an array processor of the type described in U.S. patent application Ser. No. 342,630 referenced above, entitled "An Array Processor Architecture Utilizing Modular Elemental Processors." The processor described therein is composed of a plurality of modular Elemental processors, the modules being of a number of different functional types. These modules may be of such general functional types as memory, accumulator, converter, counter, and comparator, with each type nominally including an input programmable logic circuit and a closely associated memory register.

The modules of the Array Processor are associated so that the Elemental processors are architecturally parallel to one another. The principal flow of data within the Array Processor, based on the simultaneous transfer of data words within the Elemental Processors, is thereby correspondingly parallel. The modules are also architecturally associated as functional planes that lie transverse to the Elemental processors. Each functional plane is thereby comprised of an array of modules that are each otherwise associated with a separate Elemental processor. Further, the modules of a functional plane are of a single functional type. This allows the data of a two-dimensionally structured digital data set, present within the Array Processor, to be processed identically and in parallel by a common logical operation as provided and performed by a functional plane. Modular input-programmable logic circuits for use in the array processor are described in detail in U.S. patent application Ser. No. 342,639, referenced above.

Figure 1:
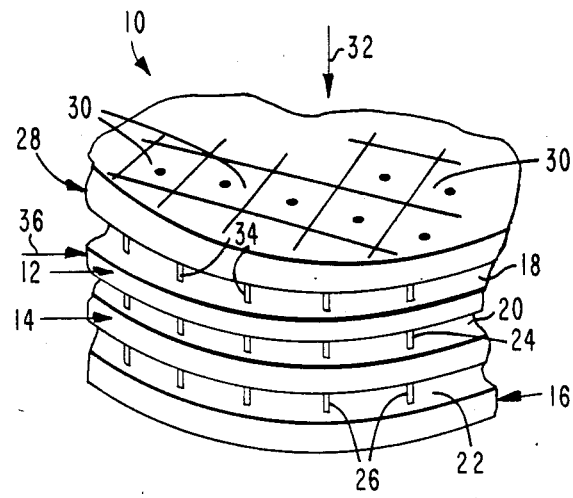
FIG. 1 is a perspective view of a first embodiment of the invention showing a photosensor array coupled to a multi-level matrix of elemental processors.

Referring to FIG. 1, there is shown a first embodiment 10 of the invention. A plurality of elemental array processors are provided which are composed of a vertical stack of modules. The modules are arranged as functional planes 12, 14, and 16. On each plane are located modules of a similar functional type. For example, on plane 12 are located comparator modules 18, and on plane 14 are located memory modules 20. Plane 16 typically contains modules 22 used to perform particular image processing functions. Additional planes may be added below the plane 16 as needed to complete the processing functions.

From the above description it may be seen that each elemental processor is made up of vertical stack of modules 18, 20, and 22. Each processor is designed to perform operations on a single data element. Signals are transferred between modules in each processor using data busses. For example, signals may be passed between a module 18 and a corresponding module 20 using a data bus 24. Similarly, signals are passed between a module 20 and a corresponding module 22 using a data 26. A complete description of this data exchange subsystem is provided in the U.S. patent application Ser. No. 342,640, referenced above.

In order to process an image, it is necessary to convert that image into suitable binary form for use by the elemental processors described above. To accomplish this function, an array 28 of photosensors 30 is provided. The photosensors 30 are arranged in a matrix such that there is one photosensor 30 for each of the elemental processors. Further, the number of photosensors 30 (and hence the number of processors) corresponds to the number of picture elements (pixel) into which the image 32 to be analyzed is to be divided. The array 28 is oriented so that it is responsive to light from the image. Each photosensor 30 provides a sensor output signal on a data bus 34 to a corresponding comparator module 18, where it appears as a comparator input signal. The magnitude of the sensor output signal is proportional to the brightness of the corresponding pixel of the image 32.

A reference voltage is provided on an external data bus 36 and appears as a second input signal to all of the comparator modules 18. The reference voltage also appears as an input signal to each of the memory elements in the modules 20.

Figure 5:
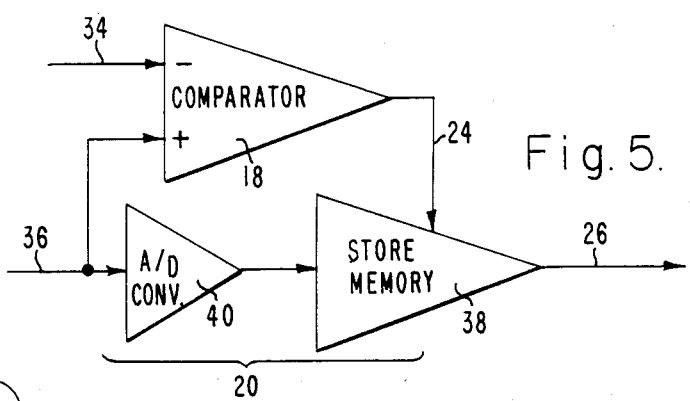
FIG. 5 is a block diagram showing the interconnections between the comparator and memory circuits in the embodiment of FIG. 1.

A block diagram of the interconnections between the various elements in the embodiment 10 is shown in FIG. 5. Both the sensor output signal and the reference voltage are provided as input signals to the comparator 18. The comparator 18 provides a comparator output signal on the bus 24 when the reference signal exceeds the sensor output signal.

The comparator output signal is used to enable a digital memory element 38 located in the module 20. When enabled, the memory 38 stores the instantaneous value of the reference voltage. An analog to digital converter 40 is included as part of the module 20 to convert the analog reference voltage to suitable digital form for storage by the memory 38. It should be noted that once the memory 38 has stored the reference voltage value, it latches this value in its memory register until reset. Reset may be accomplished by, for example, the removal of the comparator output signal. The value of the reference signal stored in the memory 38 is provided to the additional processing modules 22 using bus 26.

Figure 2:
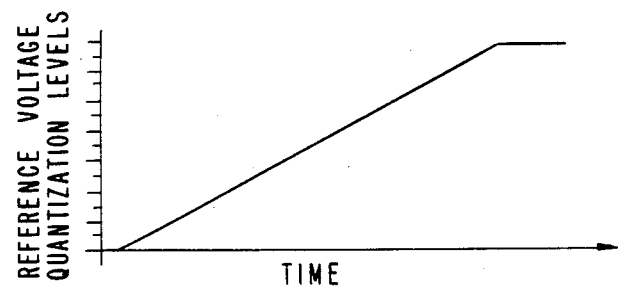
FIG. 2 is a graph showing a linearly varying reference voltage for use in the embodiment of FIG. 1.
Figure 3:
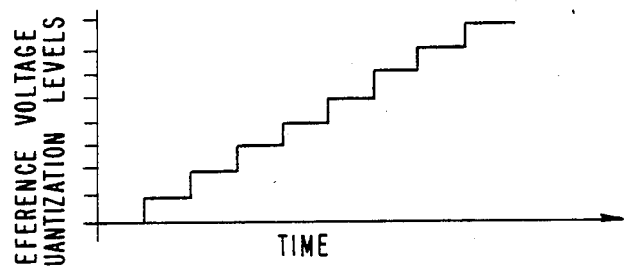
FIG. 3 is a graph showing a step-wise varying reference voltage for use in the embodiment of FIG. 1.

The operation of the above described apparatus 10 for image processing is as follows. Upon the appearance of a two-dimensional image 32 to be analyzed, a time varying reference voltage is applied to the bus 36. The reference voltage may vary either in linear fashion, as shown in FIG. 2, or in a step-wise fashion as shown in FIG. 3. As the reference voltage increases in value, there will generally be a point in each comparator module at which this voltage exceeds the sensor output signal generated in response to the brightness of the particular pixel of the image 32. When this point is reached for each comparator 18, the value of the reference voltage will be stored in the corresponding memory module 20.

It will be apparent to the reader that the value of reference voltage stored in each module 20 is representative of the brightness of the corresponding image pixel. Hence, at the end of the reference voltage scan, as shown in FIG. 2 or 3, the entire array of memory modules 20 will contain a digital representation of that image in terms of varying brightness levels. The number of such levels is controlled by the number of bits stored in the memory element 38. More bits increases the resolution or quantization of the image.

Referring to FIG. 2, the linearly increasing reference voltage will result in the resolution of the image brightness levels being controlled by the number of bits in the A/D converter 40 and memory element 38. In the instance of the step-wise increasing reference voltage the resolution is controlled by the size of the steps. Note that by using a step-wise increasing reference voltage, the A/D converter may be replaced by a counter which simply counts the number of steps.

It will be appreciated that the above embodiment of the invention provides a high-speed method of processing images. The high-speed is the result of parallel processing. A complete array of data representing the image 32 in digital form appears in the memory modules 20 after each scan of the reference voltage. This data can then be parallel-processed by the modules 2 and any additional modules as required to achieve the desired result.

Figure 4:
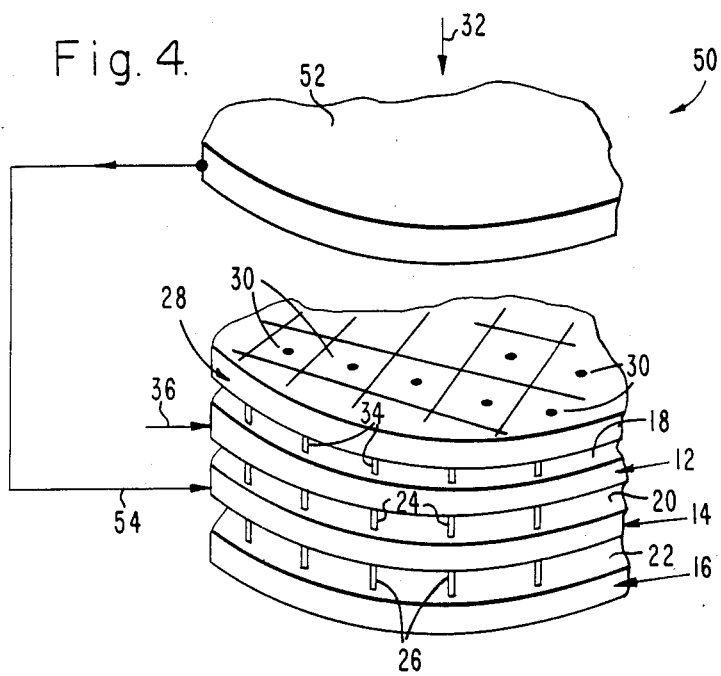
FIG. 4 is a perspective view of a second embodiment of the invention showing the use of an image attenuator between the image and the photosensor array.

An alternate embodiment 50 of the invention is shown in FIG. 4. In this embodiment, a variable attenuator 52 is interposed between the photosensor array 28 and the image 32. The attenuator 52 is used to decrease the intensity of the image impinging on the array 28. This decrease may be performed in a linear or step-wise fashion, similar to the curves shown in FIGS. 2 and 3.

The attenuator 52 may be implemented using, for example, a rotatable polarizer in conjunction with a fixed polarizer, in a manner well known to those skilled in the art. The angle of rotation of the rotatable polarizer corresponds to the degree of attenuation of light intensity. Another way of implementing the attenuator 52 is by using a liquid crystal light value. It is well known that such a device can be used to decrease light intensity in response to the application of a voltage.

In either of the examples above, it is envisioned that an attenuation signal would be available from the attenuator 52, which signal is proportional to the decrease in intensity provided by the attenuator 52. For example, in the case of the rotating polarizer, the attenuation signal can be provided by a shaft encoder which indicates the relative angular position of the polarizer. In the case of the light valve, the control voltage applied to the valve can be used as the attenuation signal.

Figure 6:
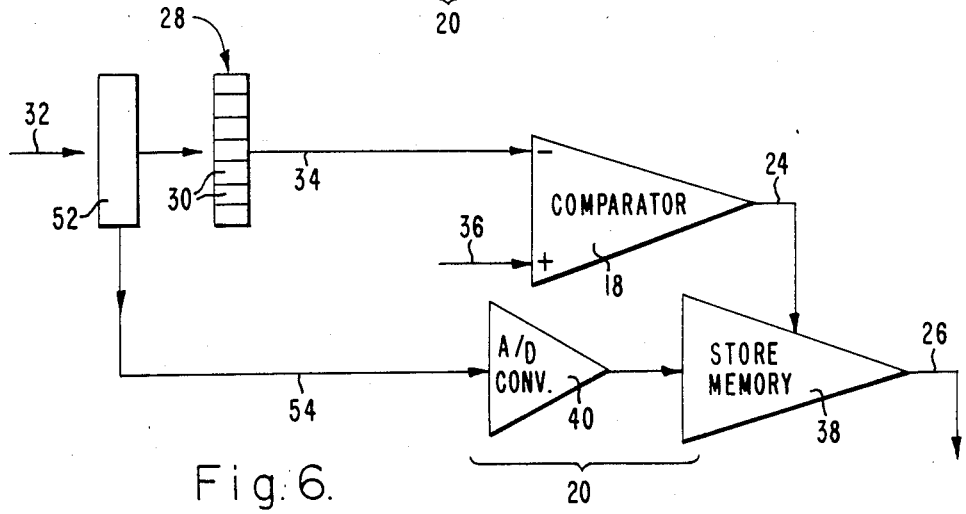
FIG. 6 is a block diagram showing the interconnections between the comparator and memory circuits in the embodiment of FIG. 4.

The attenuation signal is provided on a bus 54 as an input signal to the A/D converter 40, as shown in the block diagram of the embodiment 50 provided in FIG. 6. In this embodiment, the reference voltage appears only as an output to the comparator 18, and is held at a constant voltage equivalent to the minimum resolution or quantization of the image 32.

The operation of the embodiment 50 as an image processor is as follows. The attenuator 52 is caused to decrease the intensity of the image 32 in a time varying linear or step-wise manner. When the intensity of a particular pixel impinging on a sensor 30 is reduced by the attenuator 52 such that the sensor output signal is less than the constant reference signal, the comparator 18 provides a comparator output signal to the corresponding memory element 38. At that point in time the element 38 stores the value of the attenuation signal, which has been converted to digital form by the A/D converter 40. In many instances, the attenuation signal from the attenuator 52 may already be in digital form, in which case the converter 40 is not necessary.

From the above discussion, it will be appreciated that at the completion of a scan of the attenuation 52, there will be stored in the array of memory elements 38 digital signals representing the various levels of intensity of the pixels which make up the image 32. Accordingly, this array of data may be further processed as in the case of the previous embodiment 10.

One advantage of the embodiment 50 is that it does not require photosensors 30 having a linear response over a wide intensity range. This is so because the intensity level at which the comparator 18 measures the sensor output signal is a constant value as set by the reference signal.

While the invention is disclosed and particular embodiments are described in detail, it is not intended that the invention be limited solely to these embodiments. Many modifications will occur to those skilled in the art which are within the spirit and scope of the invention. It is thus intended that the invention be limited in scope only by the appended claims.

What is claimed is:

1. Apparatus for analyzing a two dimensional image, comprising:

a plurality of parallel elemental processors logically organized as a multi-level matrix where each elemental processor is associated with one of a plurality of data locations, each elemental processor including a plurality of modules logically distributed over the multiple levels of said matrix;

a comparator circuit in one of said modules in each process for comparing a comparator input signal with a reference signal and for providing a comparator output signal when the reference signal exceeds the input signal;

a memory element in one of said modules in each processor for storing the value of the reference signal in response to the occurrence of the comparator output signal;

an array of photosensors arranged as a matrix and responsive to light from the image, where each photosensor corresponds with one pixel of the image as well as one of the plurality of data locations and provides a sensor output signal whose magnitude is proportional to the brightness of the corresponding pixel;

means for providing the sensor output signal of each photosensor as the comparator input signal of a corresponding comparator circuit;

means for providing the reference signal to all comparator circuits simultaneously; and control means for varying the amplitude of the reference signal as a function of time.

2. The apparatus of claim 1 in which the control means varies the amplitude of the reference signal in a linear fashion.

3. The apparatus of claim 1 in which the control means varies the amplitude of the reference signal in a step-wise fashion.

4. Apparatus for analyzing a two dimensional image, comprising:

a plurality of parallel elemental processors logically organized as a multi-level matrix where each elemental processor is associated with one of a plurality of data locations, each elemental processor including a plurality of modules logically distributed over the multiple levels of said matrix;

a comparator circuit in one of said modules in each processor for comparing a comparator input signal with a reference signal and for providing a comparator output signal when the reference signal exceeds the input signal;

a memory elemental in one of said modules in each processor for storing the value of an image attenuation signal in response to the occurrence of the comparator output signal;

an array of photosensors arranged as a matrix and responsive to light from the image, where each photosensor corresponds with one pixel of the image as well as one of the plurality of data locations and provides a sensor output signal whose magnitude is proportional to the brightness of the corresponding pixel;

means for providing the sensor output signal of each photosensor as the comparator input signal of a corresponding comparator circuit;

means for providing the reference signal to all comparator circuits simultaneously;

optical attenuation means positioned between the image and the photosensor array for decreasing the intensity of the image impinging upon the array of photosensors as a function of time; and means for providing the attenuation signal as a signal whose amplitude is proportional to the decrease in intensity provided by the optical attenuation means.

5. The apparatus of claim 4 in which the optical attenuation means decreases the image intensity in a linear fashion.

6. The apparatus of claim 4 in which the optical attenuation means decreases the image intensity in a stepwise fashion.

7. The apparatus of claim 4 in which the optical attenuation means includes a rotatable polarizer.

8. The apparatus of claim 4 in which the optical attenuation means includes a liquid crystal light valve.

* * * * *